(No Model.)
L. H. COBURN & E. D. THOMPSON.
CANE STRIPPER AND HEADER.
No. 287,240. Patented Oct. 23, 1883.
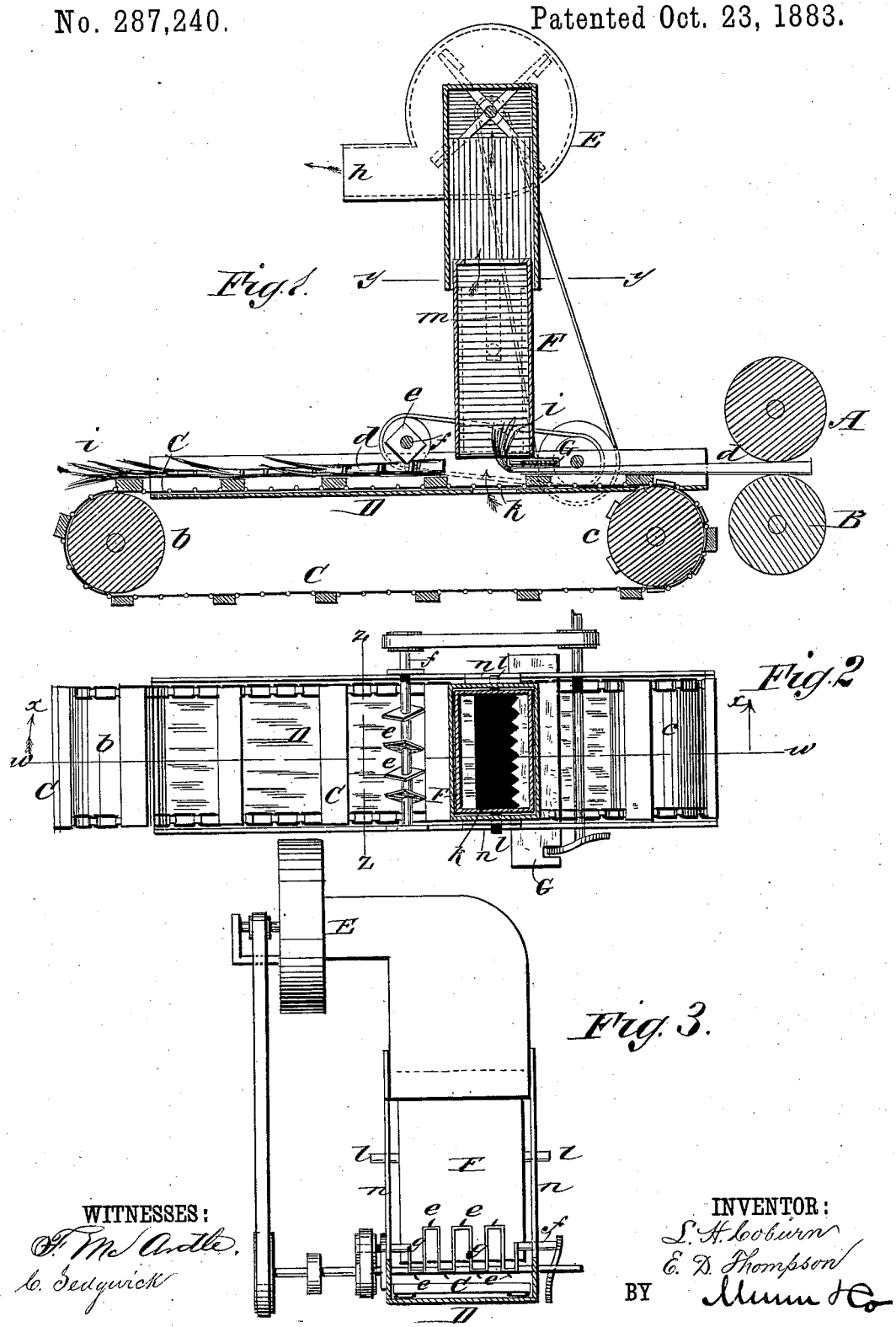
WITNESSES:
INVENTOR:
L. H. Coburn
E. D. Thompson
BY Munn & Co
ATTORNEYS.

UNITED STATES PATENT OFFICE.

LLEWELLYN H. COBURN, OF SENECA, KANSAS, AND ELIPHAZ D. THOMPSON, OF HAVANA, ILLINOIS.

CANE STRIPPER AND HEADER.

SPECIFICATION forming part of Letters Patent No. 287,240, dated October 23, 1883.

Application filed February 2, 1883. (No model.)

*To all whom it may concern:*

Be it known that we, LLEWELLYN H. COBURN, of Seneca, in the county of Nemaha and State of Kansas, and ELIPHAZ D. THOMPSON, of Havana, in the county of Mason and State of Illinois, have invented certain new and useful Improvements in Cane Strippers and Headers, of which the following is a full, clear, and exact description.

This invention relates to apparatus for stripping and heading sorghum and sugar-cane; and it consists in certain combinations of devices, including a table or carrier for feeding the cane, a series of strippers and beaters or scrapers, and a suction fan or device and draft-tube, which may be made adjustable for stripping the leaves from the cane and removing them, together with all dust, dirt, insects, and foreign substances, thereby leaving the cane cleaner than when stripped in the field; also including devices for cutting off and removing the heads from the cane. The apparatus, which will largely economize labor, may either be applied to feed the cane direct into a single mill or be speeded to strip and head cane for the most extensive sugar-works.

Reference is to be had to the accompanying drawings, forming a part of this specification, in which similar letters of reference indicate corresponding parts in all the figures.

Figure 1 represents a longitudinal sectional elevation on the line $w\ w$ in Fig. 2, looking in direction of the arrows $x\ x$, of a cane stripping and heading apparatus embodying our invention; Fig. 2, a horizontal section of the same on the line $y\ y$ in Fig. 1, and Fig. 3 a transverse vertical section on the line $z\ z$ in Fig. 2.

When the apparatus is applied to feed cane direct into a single mill, it is arranged as close to the rolls A B of the mill as convenient, as shown in Fig. 1, and power to drive it may either be taken from the mill or from any other source.

C is an endless slotted belt or chain carrier, arranged around a plain drum, $b$, and sprocket-drum $c$, for feeding the cane to the mill over a trough or table, D. The cane $d$, after it has been cut, is hauled, with its tops and leaves attached, to the apparatus and introduced, butt-ends foremost, onto the endless traveling carrier C over the rear portion of the table D. Said carrier then conveys the cane to or under a series of scrapers or strippers, or strippers and beaters combined, for stripping the leaves from the cane, and which may be of any suitable construction that will enable them to do their work without injuring the stalks of the cane, and may be varied to adapt themselves to different conditions of the cane or leaves thereon.

In Figs. 1 and 2 a stripper only is shown, composed of a series of rectangular plates, $e$, set obliquely upon a cross revolving shaft, $f$, arranged over the carrier, while in Fig. 3 a similarly-revolving shaft, $f$, is represented as being provided with a series of crank-like beaters, $g$, having oblique strippers $e$ on them. These strippers, or strippers and beaters combined, detach the leaves from the stalk and loosen other adhering substance thereon, all of which, including the leaves, dust, or dirt, and insects, are subsequently removed by the cane, as it leaves the strippers or beaters, being fed by the carrier C under a suction-spout or draft-tube, F, connected with an upper-arranged suction fan or device, E, which sucks up and expels at its outlet $h$ said leaves and extraneous matters, leaving the cane $d$ on the carrier C comparatively clean, but with the blades and heads $i$ attached to the stalks. As said heads, however, pass under the draft-tube E they are raised by the sucking action of the fan, as shown in Fig. 1, into a position to provide for their removal either by a series of suitably-disposed rotary or other cutters or by a transversely-reciprocating sickle or knife, G, arranged over the carrier. The heads thus removed may either be sucked up by the fan and deposited, together with the leaves, for fodder, or they may be deposited separate through an opening, $k$, in the table, for seed, as well as feed. The draft-tube F is fitted, so as to be telescopic, within or on the fan or branch pendent therefrom, and may be guided up or down by pins or studs $l\ l$ on said tube, passing through slots $m$ in uprights $n\ n$, attached to the table, to regulate the distance of the bottom of the tube from the cane passing under it, and to control the suction, as required.

We do not restrict ourselves to the precise construction herein shown and described of the carrier C.

Having thus described our invention, we claim as new and desire to secure by Letters Patent—

1. The combination of the cutter G, revolving strippers e, and beaters g, with the draft-tube F, and endless belt or chain carrier C, essentially as described.

2. The combination of the cutter G, the table D, the carrier C, the rotating strippers e, and the suction fan or device E, with its attached tube, substantially as specified.

3. An apparatus for stripping and heading cane, in which are combined the following elements: a traveling carrier for feeding the cane, strippers, with or without beaters, for detaching the leaves from the cane, one or more cutters for removing the heads therefrom, and a suction fan or device for removing the detached leaves and extraneous substances, and whereby the heads are adjusted into position for detachment by the cutter or cutters, substantially as specified.

LLEWELLYN H. COBURN.
ELIPHAZ D. THOMPSON.

Witnesses to L. H. Coburn:
JOHN F. CURRAN,
ABIJAH WELLS.

Witnesses to Eliphaz D. Thompson:
JOHN H. SCHULTE,
J. H. HAVIGHORST, Jr.